United States Patent
Jin et al.

(10) Patent No.: US 9,749,263 B2
(45) Date of Patent: Aug. 29, 2017

(54) METHODS AND SYSTEMS FOR IDENTIFYING AND REDUCING LTE-SYSTEM COVERAGE HOLES DUE TO EXTERNAL INTERFERENCE

(71) Applicant: MOTOROLA SOLUTIONS, INC, Schaumburg, IL (US)

(72) Inventors: Xiaowei Jin, Iverness, IL (US); Michael H Baker, Elmhurst, IL (US); Isam R Makhlouf, Lake Zurich, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 63 days.

(21) Appl. No.: 14/533,251

(22) Filed: Nov. 5, 2014

(65) Prior Publication Data

US 2016/0127273 A1     May 5, 2016

(51) Int. Cl.
*H04B 15/00* (2006.01)
*H04B 17/00* (2015.01)
(Continued)

(52) U.S. Cl.
CPC ......... *H04L 49/557* (2013.01); *H04B 1/1036* (2013.01); *H04B 17/309* (2015.01);
(Continued)

(58) Field of Classification Search
CPC ...... H04W 24/02; H04W 24/04; H04W 28/04
(Continued)

(56) References Cited

U.S. PATENT DOCUMENTS

| 5,287,556 | A | 2/1994 | Cahill | |
| 7,639,986 | B2 * | 12/2009 | Vincent | H04H 20/95 455/296 |

(Continued)

FOREIGN PATENT DOCUMENTS

| EP | 283299 B1 | 5/1996 |
| EP | 542520 B1 | 3/1997 |
| WO | 2014098915 A1 | 6/2014 |

OTHER PUBLICATIONS

Nokia Siemens Networks et al: "HeNB Interference management for LTE Rel-9 via power control", 3GPP Draft; R4-093644, 3rd Generation Partnership Project (3GPP), Mobile Competence Centre; 6650, Route Des Lucioles; F-06921 Sophia-Antipolis Cedex; France, No. Miyazaki; 20091012, Oct. 12, 2009, all pages.l.

The International Search Report and the Written Opinion, PCTUS/2015/05789, filed: Oct. 23, 2015, dated Jan. 27, 2016, all pages.

*Primary Examiner* — Joshua Schwartz
(74) *Attorney, Agent, or Firm* — Barbara R. Doutre; Daniel R. Bestor

(57) ABSTRACT

Disclosed herein are methods and systems for identifying and reducing LTE-system coverage holes due to external interference. One embodiment takes the form of a process that includes receiving a signal in a first wireless band. The received signal comprises a signal of interest. The process also includes determining that a received signal quality of the signal of interest is less than a signal-quality threshold. The process also includes determining that the received signal quality of the signal of interest is less than the signal-quality threshold due to interference external to the first wireless band, and responsively attenuating the received signal. The process also includes demodulating the attenuated received signal to obtain the signal of interest.

13 Claims, 4 Drawing Sheets

(51) Int. Cl.
    *H04W 24/00*    (2009.01)
    *H04L 12/939*   (2013.01)
    *H04L 12/26*    (2006.01)
    *H04B 17/336*   (2015.01)
    *H04W 4/02*    (2009.01)
    *H04B 1/10*    (2006.01)
    *H04B 17/309*   (2015.01)
    *H04B 17/318*   (2015.01)
    *H04W 24/02*   (2009.01)
    *H04B 17/345*   (2015.01)

(52) U.S. Cl.
    CPC ........... *H04B 17/336* (2015.01); *H04L 43/16* (2013.01); *H04W 4/02* (2013.01); *H04B 17/318* (2015.01); *H04B 17/345* (2015.01); *H04W 24/02* (2013.01)

(58) Field of Classification Search
    USPC .................................................. 455/63.1, 423
    See application file for complete search history.

(56) References Cited

U.S. PATENT DOCUMENTS

| | | |
|---|---|---|
| 8,457,584 B2 | 6/2013 | Currivan |
| 2003/0181180 A1 | 9/2003 | Darabi et al. |
| 2003/0198306 A1 | 10/2003 | Forrester |
| 2005/0075077 A1* | 4/2005 | Mach ............. H04B 1/406 455/67.13 |
| 2008/0160916 A1* | 7/2008 | Jagger ............ H04B 1/1036 455/63.1 |
| 2010/0130133 A1* | 5/2010 | Lou ............... H04B 1/109 455/63.1 |
| 2012/0088498 A1 | 4/2012 | Xiao et al. |
| 2013/0244678 A1 | 9/2013 | Damnjanovic et al. |
| 2014/0036656 A1 | 2/2014 | Chou et al. |
| 2014/0066116 A1* | 3/2014 | Gao ............... H04W 24/10 455/509 |
| 2014/0248916 A1* | 9/2014 | Nakamuru ....... H04W 72/0453 455/501 |
| 2014/0286316 A1* | 9/2014 | Park ............... H04W 36/22 370/332 |

\* cited by examiner

METHODS AND SYSTEMS FOR IDENTIFYING AND REDUCING LTE-SYSTEM COVERAGE HOLES DUE TO EXTERNAL INTERFERENCE

BACKGROUND OF THE INVENTION

It is important for people to have connectivity to communication services (e.g., telephony, data services, and the like). To facilitate communication between user equipment and various radio access networks (RANs), network entities such as eNodeBs, base stations, and the like typically operate to establish a link between a given wireless communication device (WCD) (e.g., a handheld mobile radio) and a given network resource, typically using a standard for over-the-air communication, an example of which is 3GPP's Long Term Evolution (LTE), which is one example protocol for a type of wireless communication known as orthogonal frequency division multiplex (OFDM) communication. In addition to mobile radios, some examples of commonly used WCDs include cell phones, smartphones, tablets, notebook computers, laptop computers, and the like. And certainly many other examples of WCDs could be listed as well, as known to those having skill in the art.

It is desirable for people to be able to communicate with one another in as many locations as possible; this is certainly true in the context of public-safety wireless communications for at least the reason that the immediacy and efficacy with which people can communicate with one another are quite often determinative of how positive the ultimate outcome of a given public-safety incident can be. Accordingly, for this reason and others, there is a need for methods and systems for identifying and reducing LTE-system coverage holes due to external interference.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
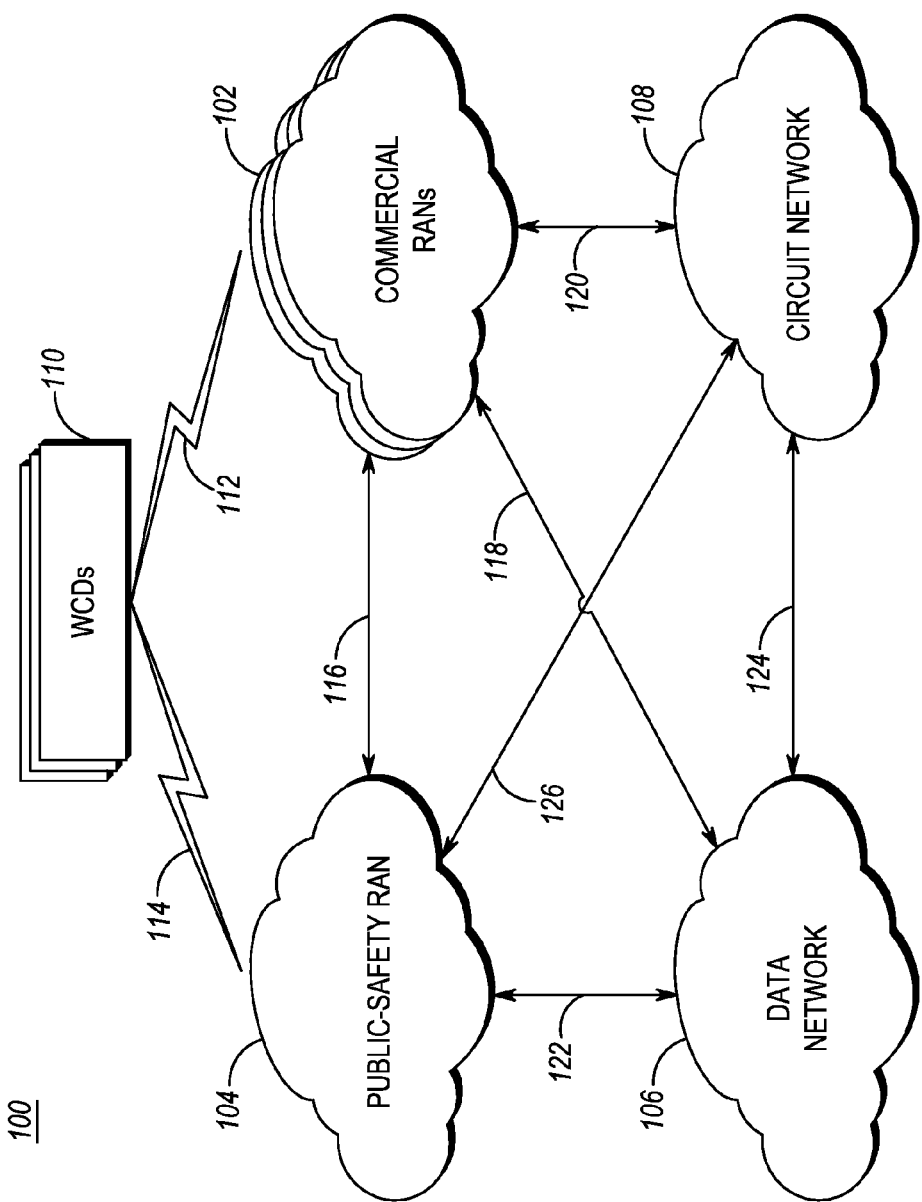
FIG. 1 depicts an example communication system, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for identifying and reducing LTE-system coverage holes due to external interference. One embodiment takes the form of a process that includes receiving a signal in a first wireless band. The received signal includes a signal of interest. The process also includes determining that a received signal quality of the signal of interest is less than a signal-quality threshold. The process also includes determining that the received signal quality of the signal of interest is less than the signal-quality threshold due to interference external to the first wireless band, and responsively attenuating the received signal. The process also includes demodulating the attenuated received signal to obtain the signal of interest. Moreover, it is explicitly noted that, although the title of this disclosure mentions LTE systems, the present methods and systems are applicable to any suitable wireless communication systems.

Another embodiment takes the form of a mobile radio that includes a wireless-communication interface, a processor, and data storage containing instructions executable by the processor for causing the system to carry out at least the functions described in the preceding paragraph.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, the process further includes measuring a reference signal received quality (RSRQ) of the signal of interest. In at least one such embodiment, determining that the received signal quality of the signal of interest is less than the signal-quality threshold includes determining that the measured RSRQ is less than an RSRQ threshold.

In at least one embodiment, the process further includes measuring a signal-to-noise-and-interference ratio (SINR) of the signal of interest. In at least one such embodiment, determining that the received signal quality of the signal of interest is less than the signal-quality threshold includes determining that the measured SINR is less than a SINR threshold.

In at least one embodiment, the process further includes calculating a level of external interference present in the received signal, and determining that the received signal quality of the signal of interest is less than the signal-quality threshold due to interference external to the first wireless band includes determining that the calculated level of external interference exceeds an external-interference threshold; in the balance of this detailed description, the term "external-interference-calculation embodiment" is used as shorthand reference for such embodiments.

In at least one external-interference-calculation embodiment, determining that the calculated level of external interference exceeds the external-interference threshold includes determining that the calculated level of external interference exceeds the external-interference threshold by at least an external-interference hysteresis value.

In at least one external-interference-calculation embodiment, the process further includes determining a received power level of the received signal and determining a received power level of the signal of interest, and calculating the level of external interference includes calculating the level of external interference to be equal to the difference between (i) the determined received power level of the received signal and (ii) the determined received power level of the signal of interest. In at least one embodiment, determining the received power level of the received signal includes measuring a received signal strength indicator (RSSI) of the received signal and determining the received power level of the received signal to be equal to the measured RSSI. In at least one embodiment, determining the received power level of the signal of interest includes determining a reference signal received power (RSRP) of the signal of interest and determining the received power level of the signal of interest to be equal to the product of (i) the determined RSRP of the signal of interest and (ii) a number of resource blocks characteristic of a bandwidth of the signal of interest.

In at least one external-interference-calculation embodiment, the received signal further includes one or more neighbor-cell signals of the first wireless band, and the process further includes determining a received power level of the received signal, determining a received power level of the signal of interest, and determining an aggregate received power level of the one or more neighbor-cell signals of the first wireless band; in at least one such embodiment, calculating the level of external interference includes calculating the level of external interference to be equal to the difference between (i) the determined received power level of the received signal and (ii) the sum of (a) the determined received power level of the signal of interest and (b) the determined aggregate received power level of the one or more neighbor-cell signals of the first wireless band.

In at least one further embodiment, determining the received power level of the signal of interest includes determining an RSRP of the signal of interest, and further includes determining the received power level of the signal of interest to be equal to the product of (i) the determined RSRP of the signal of interest and (ii) a number of resource blocks characteristic of a bandwidth of the signal of interest.

In at least one such embodiment, determining the aggregate received power level of the one or more neighbor-cell signals of the first wireless band includes determining a respective RSRP of each of the one or more neighbor-cell signals of the first wireless band and determining the aggregate received power level of the one or more neighbor-cell signals of the first wireless band to be equal to the sum of the respective products of (iii) the determined RSRP of each of the one or more neighbor-cell signals of the first wireless band and (iv) a number of resource blocks characteristic of a bandwidth of the corresponding neighbor-cell signal.

In at least one other such embodiment, determining the aggregate received power level of the one or more neighbor-cell signals of the first wireless band includes determining a collective RSRP of the one or more neighbor-cell signals of the first wireless band and determining the aggregate received power level of the one or more neighbor-cell signals of the first wireless band to be equal to the product of (v) the determined collective RSRP of the one or more neighbor-cell signals of the first wireless band and (vi) a number of resource blocks characteristic of an average bandwidth of the one or more neighbor-cell signals of the first wireless band.

In at least one embodiment in which the received signal further includes one or more neighbor-cell signals of the first wireless band, the process further includes determining an RSRP of the signal of interest, determining a collective RSRP of the one or more neighbor-cell signals of the first wireless band, and measuring a SINR of the signal of interest. The process further includes calculating the difference between (i) the determined RSRP of the signal of interest and (ii) the determined collective RSRP of the one or more neighbor-cell signals of the first wireless band. In at least one such embodiment, determining that the received signal quality of the signal of interest is less than the signal-quality threshold due to interference external to the first wireless band includes determining that the calculated difference is greater than the measured SINR. In at least one further embodiment, determining that the calculated difference is greater than the measured SINR includes determining that the calculated difference is greater than the measured SINR by at least a SINR hysteresis value.

In at least one embodiment, the process further includes determining a current location and obtaining interference-prediction data for the determined current location. In at least one such embodiment, determining that the received signal quality of the signal of interest is less than the signal-quality threshold due to interference external to the first wireless band includes determining that the received signal quality of the signal of interest is less than the signal-quality threshold due to interference external to the first wireless band based at least in part on the obtained interference-prediction data.

In at least one further embodiment, obtaining the interference-prediction data for the determined current location includes querying an interference-prediction database using the determined current location and receiving the interference-prediction data from the interference-prediction database.

In at least one embodiment, attenuating the received signal includes iteratively increasing an amount of attenuation applied to the received signal while monitoring a signal-quality metric of the received signal, and stopping the iterative increasing of the amount of attenuation applied to the received signal in response to detecting no further improvement in the monitored signal-quality metric.

In at least one embodiment, attenuating the received signal includes selecting an amount of attenuation to be applied to the received signal based at least in part on external-system transmitter-properties data.

In at least one embodiment, the process further includes outputting the demodulated signal.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

Figure 2:
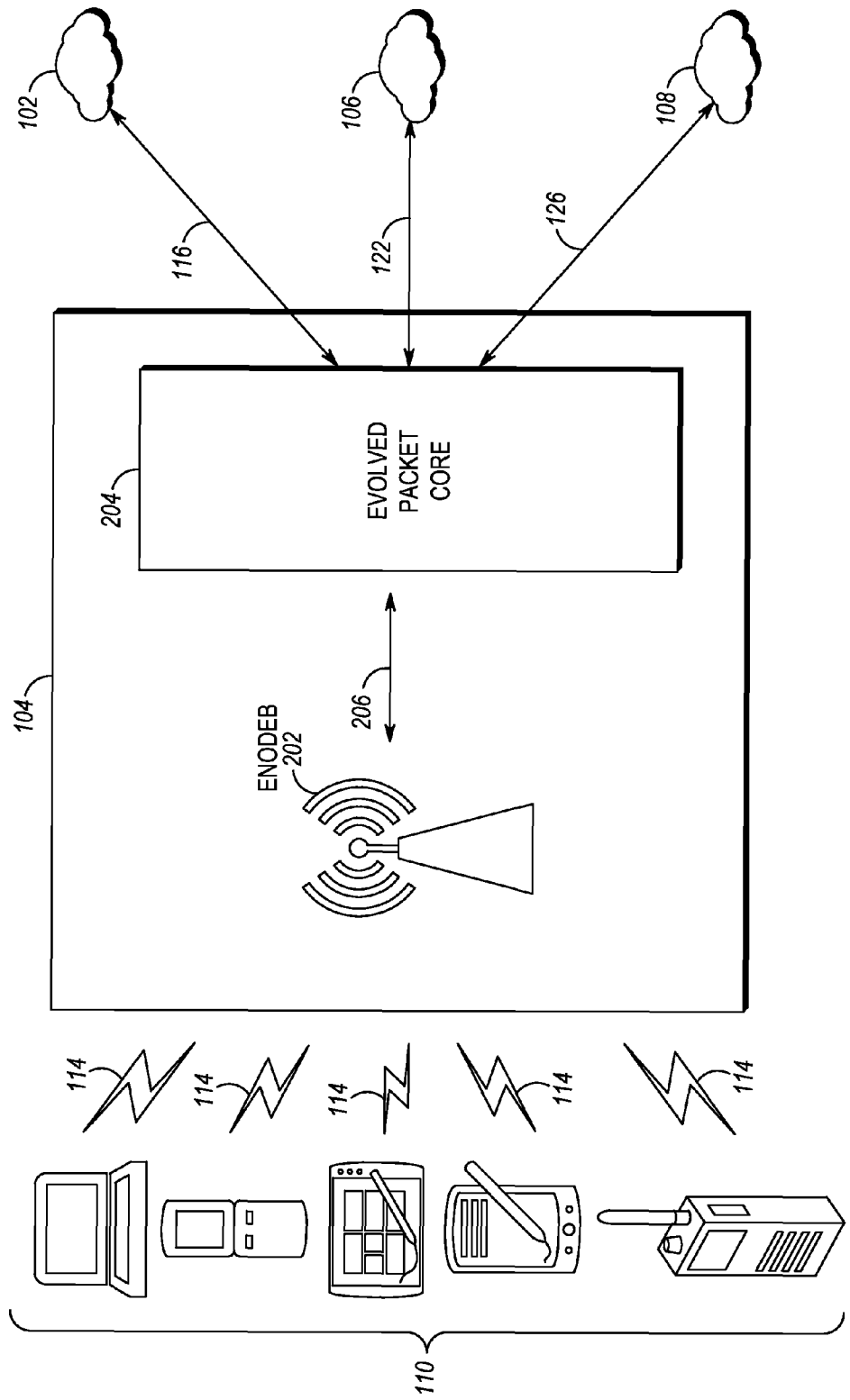
FIG. 2 depicts a further example of aspects of the communication system of FIG. 1, in accordance with an embodiment.

The following portion of this disclosure includes descriptions of FIGS. 1 and 2, which in general depict a communication system in which mobile radios communicate via one or more RANs. It is explicitly noted that mobile radios that communicate via one or more RANs may also be capable of communicating directly with one another. Thus, mobile radios that are capable of both direct-mode and RAN-based communication could carry out and embody the present methods and systems.

FIG. 1 depicts an example communication system, in accordance with an embodiment. In particular, FIG. 1 depicts an example communication system 100 that includes one or more commercial RANs 102, a public-safety RAN 104, a data network 106, a circuit network 108, WCDs 110, and communication links 112-126.

In general, in at least one embodiment, each RAN 102 and the RAN 104 includes typical RAN elements such as base stations, base station controllers, routers, switches, and the like, arranged, connected, and programmed to provide wireless service to user equipment (e.g., WCDs 110) in a manner known to those of skill in the relevant art.

The public-safety RAN 104, an example implementation of which is discussed below in connection with FIG. 2, may include one or more packet-switched networks and/or one or more circuit-switched networks, and in general functions to provide one or more public-safety agencies with any necessary computing and communication needs. Thus, the public-safety RAN 104 may include a dispatch center communicatively connected with the data network 106 and also with the circuit network 108, for retrieving and transmitting any necessary public-safety-related data and communications. The public-safety RAN 104 may also include any necessary computing, data-storage, and data-presentation resources utilized by public-safety personnel in carrying out their public-safety functions. Moreover, the public-safety RAN 104 may include one or more network access servers (NASs), gateways, and the like for bridging communications to one or more other entities and/or networks, such as the commercial RANs 102, the data network 106, and the circuit network 108, as representative examples.

The data network 106 may be, include, or be a part of the global network of networks typically referred to as the Internet. The data network 106 may be a packet-switched network, and entities (i.e., servers, routers, computers, and the like) that communicate over the data network 106 may be identified by a network address such as an Internet Protocol (IP) address. Moreover, the data network 106 may include one or more NASs, gateways, and the like for bridging communications to one or more other entities and/or networks, such as the commercial RANs 102, the public-safety RAN 104, and the circuit network 108, as representative examples.

The circuit network 108 may be, include, or be a part of the circuit-switched telephone network commonly referred to as the public switched telephone network (PSTN), and in general functions to provide circuit-switched communications to various communication entities as is known in the relevant art. Moreover, the circuit network 108 may include one or more NASs, gateways, and the like for bridging communications to one or more other entities and/or networks, such as the commercial RANs 102, the public-safety RAN 104, and the data network 106, as representative examples.

The depicted example communication system 100 includes communication links 112-126, any one or more of which could include one or more wireless-communication links and/or one or more wired-communication links. In FIG. 1, the communication links 112 and 114 are depicted with respective lightning-bolt graphics; while this graphic typically denotes wireless communication, and does in this example as well, this is not to the exclusion of one or more of the other communication links 116-126 being or including wireless-communication links.

The WCDs 110 may be any suitable computing and communication devices configured to engage in wireless communication with one or both of one or more of the RANs 102 over the air interface 112 as is known to those in the art and the public-safety RAN 104 over the air interface 114 as is known to those in the art. Some example WCDs 110 are discussed below in connection with the various figures.

As can be seen in FIG. 1, the communication link 112 (as mentioned above) connects the commercial RANs 102 and the WCDs 110, the communication link 114 (as mentioned above) connects the public-safety RAN 104 and the WCDs 110, the communication link 116 connects the commercial RANs 102 and the public-safety RAN 104, the communication link 118 connects the commercial RANs 102 and the data network 106, the communication link 120 connects the commercial RANs 102 and the circuit network 108, the communication link 122 connects the public-safety RAN 104 and the data network 106, the communication link 124 connects the data network 106 and the circuit network 108, and the communication link 126 connects the public-safety RAN 104 and the circuit network 108. This arrangement is provided purely by way of example, as other arrangements could be implemented by those of skill in the relevant art in various different contexts.

FIG. 2 depicts a further example of aspects of the communication system of FIG. 1, in accordance with an embodiment. FIG. 2 depicts the communication system 100 of FIG. 1, though in more detail regarding some example WCDs 110 and an example public-safety RAN 104, although a similar figure could be depicted with an example commercial RAN 102 instead of the example public-safety RAN 104. In particular, FIG. 2 depicts the public-safety RAN 104 as including an eNodeB 202, which communicates directly or indirectly with an evolved packet core (EPC) 204 over a communication link 206. As is the case with each of the links mentioned above, and as is the case with any of the links mentioned anywhere else in this disclosure, the communication link 206 may be or include one or more wireless-communication links and/or one or more wired-communication links, as deemed suitable by those of skill in the relevant art in a given context.

In at least one embodiment, the eNodeB 202 includes the hardware and software (and/or firmware) necessary for the eNodeB 202 to function as an eNodeB, a NodeB, a base station, a base transceiver station (BTS), a WiFi access point, and/or the like, as known to those having skill in the relevant art. In some instances, the eNodeB 202 also includes functionality typically associated in the art with entities that are often referred to by terms such as base station controllers (BSCs), radio network controllers (RNCs), and the like. Also, while one eNodeB 202 is depicted by way of example in FIG. 2, any suitable number of eNodeBs could be deployed as deemed suitable by those of skill in the relevant art.

In general, the eNodeB 202 is an entity that, on one side (i.e., the wireless-network side (interface)), engages in wireless communications over the air interface 114 with one or more WCDs 110 according to a protocol such as LTE or the like and, on the other side (i.e., the "backhaul" side), engages in communications with the EPC 204 via the communication link 206, to facilitate communications between various WCDs 110 and networks such as the networks 102, 106, and 108.

The EPC 206 may include one or more network entities such as one or more mobility management entities (MMEs), one or more serving gateways (SGWs), one or more packet data network (PDN) gateways (PDGs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to the WCDs 110 via the eNodeB 204, and to bridge such wireless service with various transport networks. In general, a commercial RAN and a public-safely RAN may each provide wireless service according to a protocol such as LTE, WiFi, APCO P25, and/or the like. These examples are provided for illustration and not by way of limitation; moreover, those of skill in the art are aware of variations among different protocols and among different implementations of a given protocol, and of similarities across different protocols.

Figure 3:
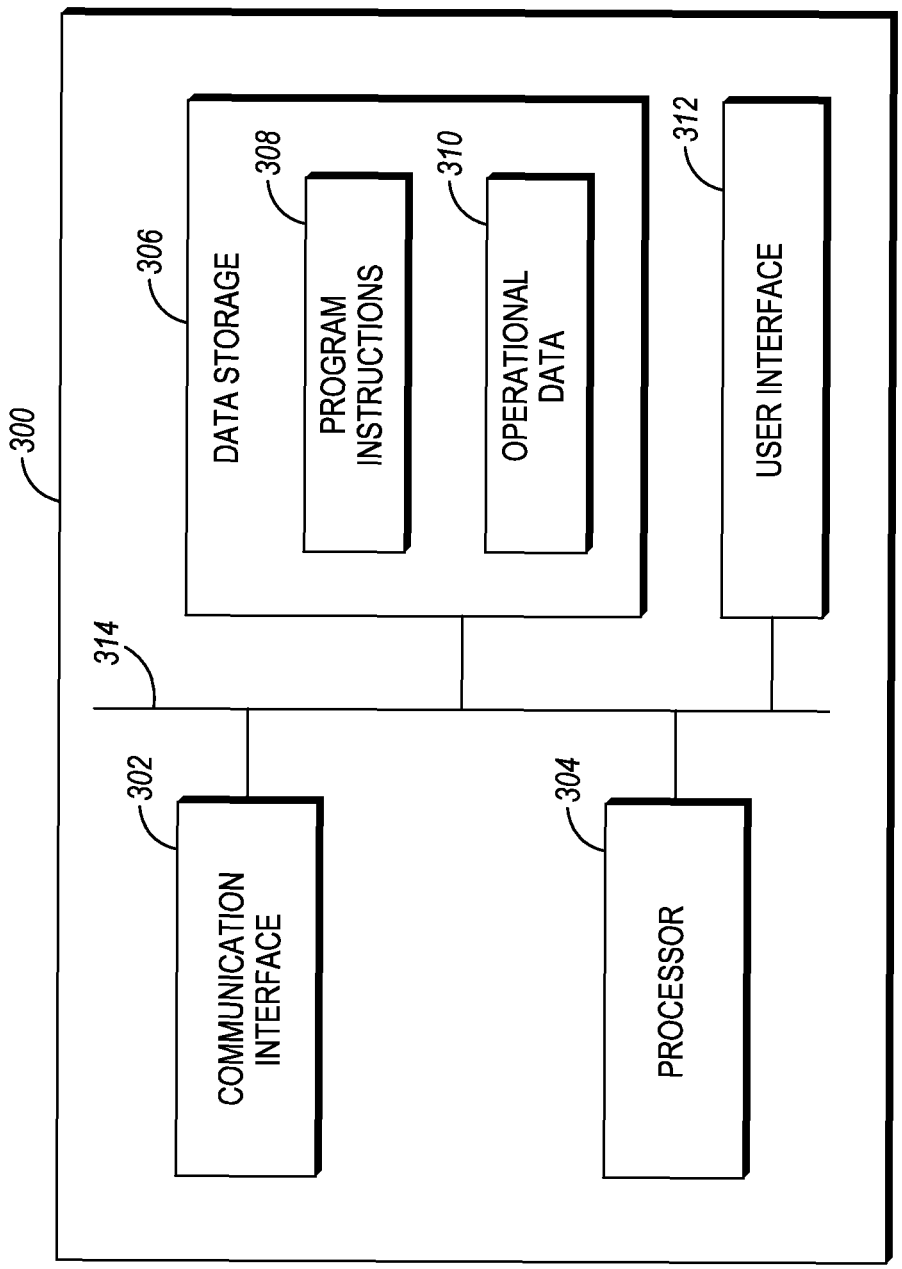
FIG. 3 depicts an example computing and communication device (CCD), in accordance with an embodiment.

FIG. 3 depicts an example computing and communication device (CCD), in accordance with an embodiment. At least one embodiment takes the form of a system that includes a communication interface, a processor, and data storage containing instructions executable by the processor for causing the system to carry out a set of functions. The set of functions includes receiving a signal in a first wireless band. The received signal includes a signal of interest. The set of functions also includes determining that a received signal quality of the signal of interest is less than a signal-quality threshold. The set of functions also includes determining that the received signal quality of the signal of interest is less than the signal-quality threshold due to interference external to the first wireless band, and responsively attenuating the received signal. The set of functions also includes demodulating the attenuated received signal to obtain the signal of interest.

The example CCD 300 is depicted as including a communication interface 302, a processor 304, a data storage 306, and an optional user interface 312, all of which are communicatively coupled with one another via a system bus (or other suitable connection, network, or the like) 314. As a general matter, the example CCD 300 is presented as an example system that could be programmed and configured to carry out the functions described herein.

The communication interface 302 may include one or more wireless-communication interfaces (for communicating according to, e.g., LTE, Wi-Fi, Bluetooth, and/or one or more other wireless-communication protocols) and/or one or more wired-communication interfaces (for communicating according to, e.g., Ethernet, USB, and/or one or more other wired-communication protocols). As such, the communication interface 302 may include any necessary hardware (e.g., chipsets, antennas, Ethernet cards, etc.), any necessary firmware, and any necessary software for conducting one or more forms of communication with one or more other entities as described herein. The processor 304 may include one or more processors of any type deemed suitable by those of skill in the relevant art, some examples including a general-purpose microprocessor and a dedicated digital signal processor (DSP).

The data storage 306 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 3, the data storage 306 contains program instructions 308 executable by the processor 304 for carrying out various functions and operational data 310. In an embodiment in which a computing system such as the example CCD 300 is arranged, programmed, and configured to carry out processes such as the process 400 described herein, the program instructions 308 are executable by the processor 304 for carrying out those functions; in instances where other entities described herein have a structure similar to that of the example CCD 300, the respective program instructions 308 for those respective devices are executable by their respective processors 304 to carry out functions respectively performed by those devices.

The optional user interface 312 may include one or more input devices (a.k.a. components and the like) and/or one or more output devices. With respect to input devices, the optional user interface 312 may include one or more touch-screens, buttons, switches, microphones, and the like. With respect to output devices, the optional user interface 312 may include one or more displays, speakers, light emitting diodes (LEDs), and the like. Moreover, one or more components (e.g., an interactive touchscreen-and-display component) of the optional user interface 312 could provide both user-input and user-output functionality. And certainly other user-interface components could be used in a given context, as known to those of skill in the art.

Figure 4:
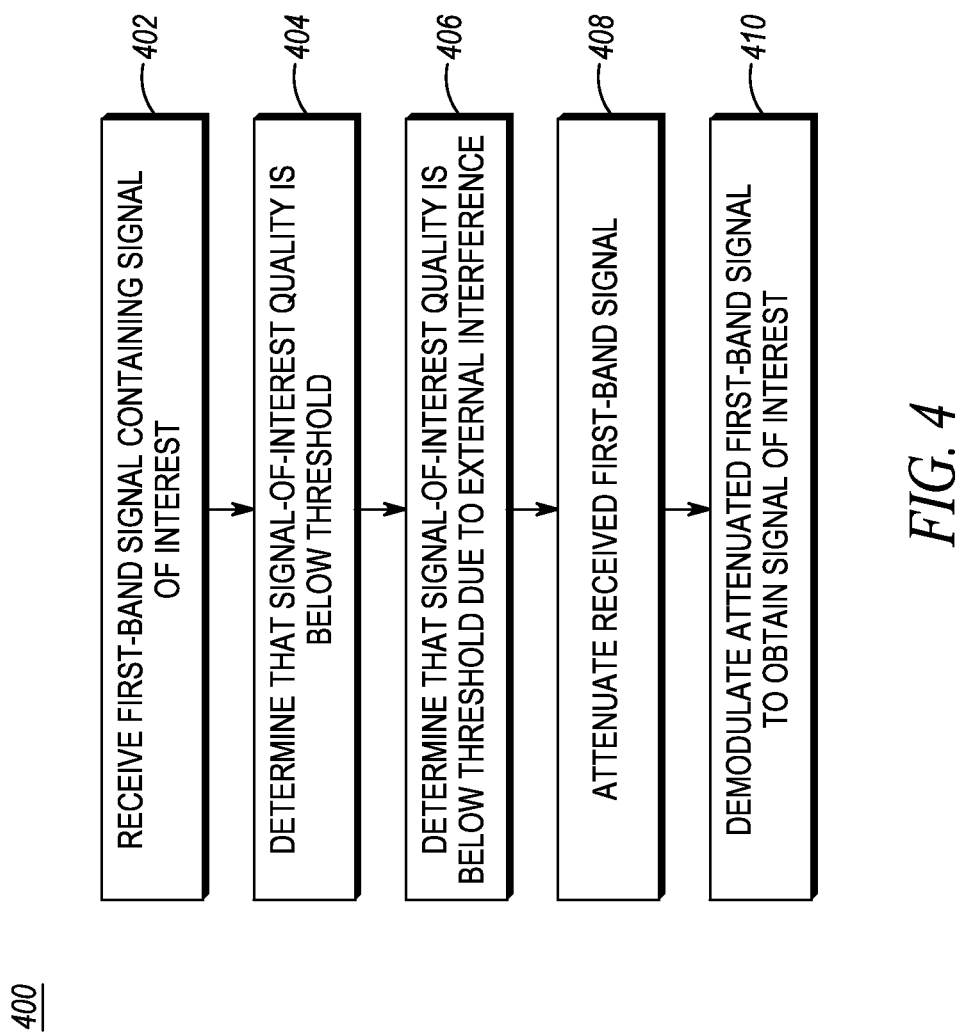
FIG. 4 depicts an example process, in accordance with an embodiment.

FIG. 4 depicts an example process, in accordance with an embodiment. In particular FIG. 4 depicts a process 400 that includes steps 402, 404, 406, 408, and 410. These steps are described below. In at least one embodiment, the process 400 is carried out by a mobile radio such as an example WCD 110. In general, the process 400 could be carried out by any radio (e.g., by any mobile radio, portable radio, and/or other radio) having a receiver and being otherwise suitably equipped, programmed, and configured to carry out the process 400 (and/or one or more of the many variants of the process 400 discussed herein).

Step 402 includes receiving a signal in a first wireless band. The received signal includes a signal of interest. In at least one embodiment, the received signal includes interference due to one or more of out-of-band emission(s) (OOBE), receiver blocking, and receiver inter-modulation distortion (IMD). OOBE may be present when an interfering signal is sent in a band that is immediately to either side of the first band. Receiver blocking is a known phenomenon that often results in the desensitizing of a receiver. IMD often occurs when two signals combine at a receiver and produce an unwanted signal that falls within the first wireless band, often due to non-linear effects. These are examples of interference that can result in coverage holes. OOBE is a type of interference that can really only be mitigated at the transmitter of the out-of-band (OOB) signal, while receiver blocking and IMD are issues that are both caused by external interference and able to be mitigated by a given receiver. It is this latter category of interference issues—of which receiver blocking and IMD are examples—that the present methods and systems are helpful in addressing, among other beneficial effects of implementation of the present methods and systems.

Step 404 includes determining that a received signal quality of the signal of interest ($Quality_{signal\ of\ interest}$) is less than a signal-quality threshold ($Quality_{threshold}$) as represented by Equation 1 below.

$$Quality_{signal\ of\ interest} < Quality_{threshold} \qquad \text{(Equation 1)}$$

In at least one embodiment, the process 400 further includes measuring an RSRQ of the signal of interest ($RSRQ_{signal\ of\ interest}$). In at least one such embodiment, determining that the received signal quality of the signal of interest (Quality$_{signal\ of\ interest}$) is less than the signal-quality threshold (Quality$_{threshold}$) at step 404 is equivalent to determining that the measured RSRQ (RSRQ$_{signal\ of\ interest}$) is less than an RSRQ threshold (RSRQ$_{threshold}$), as represented by Equation 2 below. In at least one other embodiment, determining that the received signal quality of the signal of interest (Quality$_{signal\ of\ interest}$) is less than the signal-quality threshold (Quality$_{threshold}$) at step 404 includes determining that the measured RSRQ (RSRQ$_{signal\ of\ interest}$) is less than an RSRQ threshold (RSRQ$_{threshold}$), again as represented by Equation 2 below.

$$RSRQ_{signal\ of\ interest} < RSRQ_{threshold} \quad \text{(Equation 2)}$$

In at least one embodiment, the process 400 further includes measuring a SINR of the signal of interest (SINR$_{signal\ of\ interest}$). In at least one such embodiment, determining that the received signal quality of the signal of interest (Quality$_{signal\ of\ interest}$) is less than the signal-quality threshold (Quality$_{threshold}$) at step 404 is equivalent to determining that the measured SINR (SINR$_{signal\ of\ interest}$) is less than a SINR threshold (SINR$_{threshold}$), as represented by Equation 3 below. In at least one other embodiment, determining that the received signal quality of the signal of interest (Quality$_{signal\ of\ interest}$) is less than the signal-quality threshold (Quality$_{threshold}$) at step 404 includes determining that the measured SINR (SINR$_{signal\ of\ interest}$) is less than a SINR threshold (SINR$_{threshold}$), again as represented by Equation 3 below.

$$SINR_{signal\ of\ interest} < SINR_{threshold} \quad \text{(Equation 3)}$$

Step 406 includes determining that the received signal quality of the signal of interest (Quality$_{signal\ of\ interest}$) is less than the signal-quality threshold (Quality$_{threshold}$) due to interference external to the first wireless band; i.e., step 406 includes determining that the condition determined to be true at step 404 is true due to (i.e., because of, as a result of, etc.) interference external to the first wireless band (i.e., is true due to external interference).

In at least one embodiment, the process 400 includes calculating a level of external interference in the received signal (External Interference$_{calculated}$). In at least one such embodiment, determining at step 406 that the received signal quality of the signal of interest (Quality$_{signal\ of\ interest}$) is less than the signal-quality threshold (Quality$_{threshold}$) due to interference external to the first wireless band is equivalent to determining that the calculated level of external interference (External Interference$_{calculated}$) exceeds an external-interference threshold (External Interference$_{threshold}$), as represented by Equation 4 below. In at least one other embodiment, determining at step 406 that the received signal quality of the signal of interest (Quality$_{signal\ of\ interest}$) is less than the signal-quality threshold (Quality$_{threshold}$) due to interference external to the first wireless band includes determining that the calculated level of external interference (External Interference$_{calculated}$) exceeds an external-interference threshold (External Interference$_{threshold}$), again as represented by Equation 4 below.

$$External\ Interference_{calculated} > External\ Interference_{threshold} \quad \text{(Equation 4)}$$

In at least one embodiment, determining that the calculated level of external interference (External Interference$_{calculated}$) exceeds the external-interference threshold (External Interference$_{threshold}$) includes determining that the calculated level of external interference (External Interference$_{calculated}$) exceeds the external-interference threshold (External Interference$_{threshold}$) by at least an external-interference hysteresis value (Hysteresis$_{external\ interference}$), as represented by Equation 5 below.

$$External\ Interference_{calculated} - Hysteresis_{external\ interference} > External\ Interference_{threshold} \quad \text{(Equation 5)}$$

In at least one embodiment, the process 400 further includes determining a received power level of the received signal (Power$_{signal}$), as well as determining a received power level of the signal of interest (Power$_{signal\ of\ interest}$). In at least one such embodiment, calculating the level of external interference (External Interference$_{calculated}$) includes calculating the level of external interference (External Interference$_{calculated}$) to be equal to the difference between (i) the determined received power level of the received signal (Power$_{signal}$) and (ii) the determined received power level of the signal of interest (Power$_{signal\ of\ interest}$), as represented by Equation 6 below.

$$External\ Interference_{calculated} = Power_{signal} - Power_{signal\ of\ interest} \quad \text{(Equation 6)}$$

In at least one embodiment, determining the received power level of the received signal (Power$_{signal}$) includes measuring an RSSI of the received signal (RSSI$_{signal}$) and determining the received power level of the received signal (Power$_{signal}$) to be equal to the measured RSSI (RSSI$_{signal}$) as represented by Equation 7 below.

$$Power_{signal} = RSSI_{signal} \quad \text{(Equation 7)}$$

In at least one embodiment, determining the received power level of the signal of interest (Power$_{signal\ of\ interest}$) includes determining an RSRP of the signal of interest (RSRP$_{signal\ of\ interest}$) and determining the received power level of the signal of interest (Power$_{signal\ of\ interest}$) to be equal to the product of (i) the determined RSRP of the signal of interest (RSRP$_{signal\ of\ interest}$) and (ii) a number of resource blocks characteristic of a bandwidth of the signal of interest (N$_{signal\ of\ interest}$), as represented by Equation 8 below.

$$Power_{signal\ of\ interest} = RSRP_{signal\ of\ interest} * N_{signal\ of\ interest} \quad \text{(Equation 8)}$$

In at least one embodiment, the received signal includes one or more neighbor-cell signals (i.e., one or more signals from one or more cells that are in the same network as both the mobile radio carrying out the process 400 and the serving site (e.g., serving cell) with respect to that mobile radio; the concepts of serving sites (e.g., cells) and neighbor cells in a given wireless network are known to those having skill in the relevant art).

In at least one embodiment in which the received signal includes one or more neighbor-cell signals, the process 400 further includes determining a received power level of the received signal (Power$_{signal}$), determining a received power level of the signal of interest (Power$_{signal\ of\ interest}$), and determining an aggregate received power level of the one or more neighbor-cell signals (Aggregate Power$_{neighbor-cell\ signals}$) Moreover, in such embodiments, calculating the level of external interference (External Interference$_{calculated}$) includes calculating the level of external interference (External Interference$_{calculated}$) to be equal to the difference between (i) the determined received power level of the received signal (Power$_{signal}$) and (ii) the sum of (a) the determined received power level of the signal of interest (Power$_{signal\ of\ interest}$) and (b) the determined aggregate received power level of the one or more neighbor-cell signals (Aggregate Power$_{neighbor-cell\ signals}$), as represented by Equation 9 below.

$$\text{External Interference}_{calculated} = \text{Power}_{signal} - \text{(Power}_{signal\ of\ interest} + \text{Aggregate Power}_{neighborcell\ signals}) \quad \text{(Equation 9)}$$

In at least one such embodiment, determining the received power level of the signal of interest (Power$_{signal\ of\ interest}$) includes determining an RSRP of the signal of interest (RSRP$_{signal\ of\ interest}$), and the process 400 further includes determining the received power level of the signal of interest (Power$_{signal\ of\ interest}$) to be equal to the product of (i) the determined RSRP of the signal of interest (RSRP$_{signal\ of\ interest}$) and (ii) a number of resource blocks characteristic of a bandwidth of the signal of interest (N$_{signal\ of\ interest}$), as represented by Equation 10 below.

$$\text{Power}_{signal\ of\ interest} = \text{RSRP}_{signal\ of\ interest} * N_{signal\ of\ interest} \quad \text{(Equation 10)}$$

In at least one such embodiment, the received power level of the received signal (Power$_{signal}$) is equal to the measured RSSI of the received signal (RSSI$_{signal}$) as represented by Equation 11 below, which combines aspects of Equation 9 and Equation 10 above.

$$\text{External Interference}_{calculated} = \quad \text{(Equation 11)}$$
$$\text{RSSI}_{signal} - ((\text{RSRP}_{signal\ of\ interest} * N_{signal\ of\ interest}) + \text{Aggregate Power}_{neighborcell\ signals})$$

In at least one embodiment, determining the aggregate received power level of the one or more neighbor-cell signals (Aggregate Power$_{neighbor\text{-}cell\ signals}$) includes determining a respective RSRP of each of the one or more neighbor-cell signals (RSRP$_{neighbor\text{-}cell\ signal}$), and the process 400 further includes determining the aggregate received power level of the one or more neighbor-cell signals (Aggregate Power$_{neighbor\text{-}cell\ signals}$) to be equal to the sum of the respective products of (i) the determined RSRP of each of the one or more neighbor-cell signals (RSRP$_{neighbor\text{-}cell\ signal}$) and (ii) a number of resource blocks characteristic of a bandwidth of the corresponding neighbor-cell signal (N$_{neighbor\text{-}cell\ signal}$), as represented by Equation 12 below.

$$\text{Aggregate Power}_{neighborcell\ signals} = \Sigma \text{RSRP}_{neighborcell\ signal} * N_{neighborcell\ signal} \quad \text{(Equation 12)}$$

In at least one embodiment, determining the aggregate received power level of the one or more neighbor-cell signals (Aggregate Power$_{neighbor\text{-}cell\ signals}$) includes determining a collective RSRP of the one or more neighbor-cell signals (Collective RSRP$_{neighbor\text{-}cell\ signals}$), and the process 400 further includes determining the aggregate received power level of the one or more neighbor-cell signals (Aggregate Power$_{neighbor\text{-}cell\ signals}$) to be equal to the product of (i) the determined collective RSRP of the one or more neighbor-cell signals (Collective RSRP$_{neighbor\text{-}cell\ signals}$) and (ii) a number of resource blocks characteristic of an average bandwidth of the one or more neighbor-cell signals ($\overline{N}_{neighbor\text{-}cell\ signals}$), as represented by Equation 13 below.

$$\text{Aggregate Power}_{neighborcell\ signals} = \text{Collective RSRP}_{neighborcell\ signals} * \overline{N}_{neighborcell\ signals} \quad \text{(Equation 13)}$$

In at least one embodiment, the process 400 further includes determining an RSRP of the signal of interest (RSRP$_{signal\ of\ interest}$), determining a collective RSRP of the one or more neighbor-cell signals (Collective RSRP$_{neighbor\text{-}cell\ signals}$), measuring a SNR of the signal of interest (SINR$_{signal\ of\ interest}$), and calculating the difference between (i) the determined RSRP of the signal of interest (RSRP$_{signal\ of\ interest}$) and (ii) the determined collective RSRP of the one or more neighbor-cell signals (Collective RSRP$_{neighbor\text{-}cell\ signals}$). In at least one such embodiment, determining at step 406 that the received signal quality of the signal of interest (Quality$_{signal\ of\ interest}$) is less than the signal-quality threshold (Quality$_{threshold}$) due to interference external to the first wireless band is equivalent to determining that the calculated difference (RSRP$_{signal\ of\ interest}$−Collective RSRP$_{neighbor\text{-}cell\ signals}$) is greater than the measured SINR (SINR$_{signal\ of\ interest}$), as represented by Equation 14 below. In another embodiment, determining at step 406 that the received signal quality of the signal of interest (Quality$_{signal\ of\ interest}$) is less than the signal-quality threshold (Quality$_{threshold}$) due to interference external to the first wireless band includes determining that the calculated difference (RSRP$_{signal\ of\ interest}$−Collective RSRP$_{neighbor\text{-}cell\ signals}$) is greater than the measured SINR (SINR$_{signal\ of\ interest}$), again as represented by Equation 14 below.

$$\text{RSRP}_{signal\ of\ interest} - \text{Collective RSRP}_{neighborcell\ signals} > \text{SINR}_{signal\ of\ interest} \quad \text{(Equation 14)}$$

In a further embodiment, determining that the calculated difference (RSRP$_{signal\ of\ interest}$−Collective RSRP$_{neighbor\text{-}cell\ signals}$) is greater than the measured SINR (SINR$_{signal\ of\ interest}$) is equivalent to determining that the calculated difference (RSRP$_{signal\ of\ interest}$−Collective RSRP$_{neighbor\text{-}cell\ signals}$) is greater than the measured SINR (SINR$_{signal\ of\ interest}$) by at least a SINR hysteresis value ( ), as represented by Equation 15 below. In another embodiment, determining that the calculated difference (RSRP$_{signal\ of\ interest}$−Collective RSRP$_{neighbor\text{-}cell\ signals}$) is greater than the measured SINR (SINR$_{signal\ of\ interest}$) includes determining that the calculated difference (RSRP$_{signal\ of\ interest}$−Collective RSRP$_{neighbor\text{-}cell\ signals}$) is greater than the measured SINR (SINR$_{signal\ of\ interest}$) by at least a SINR hysteresis value (Hysteresis$_{SINR}$), again as represented by Equation 15 below.

$$((\text{RSRP}_{signal\ of\ interest} - \text{Collective RSRP}_{neighborcell\ signals}) - \text{Hysteresis}_{SINR}) > \text{SINR}_{signal\ of\ interest} \quad \text{(Equation 15)}$$

In at least one embodiment, step 406 further includes determining a current location and obtaining interference-prediction data for the determined current location. In at least one such embodiment, determining at step 406 that the received signal quality of the signal of interest is less than the signal-quality threshold due to interference external to the first wireless band includes determining that the received signal quality of the signal of interest is less than the signal-quality threshold due to interference external to the first wireless band based at least in part on the obtained interference-prediction data.

In at least one embodiment, determining the current location is carried out by one or more of a Global Positioning System (GPS) module, a wireless-network infrastructure user equipment location prediction, an active WiFi connection, and a list of in-range WiFi signals, though any other suitable manner or manners of determining location could be used. In at least one embodiment, obtaining the interference-prediction data for the determined current location includes querying an interference-prediction database using the determined current location and receiving the interference-prediction data from the interference-prediction database.

Step 408 includes attenuating the received signal in response to determining (at step 406) that the received signal quality of the signal of interest is less than the signal-quality threshold due to interference external to the first wireless band. In at least one embodiment, attenuating the received signal includes iteratively increasing an amount of attenuation applied to the received signal while monitoring a signal-quality metric (e.g., RSRQ, SINR, and/or the like) of the received signal, and stopping the iterative increasing of the amount of attenuation applied to the received signal in response to detecting no further improvement (e.g., no further improvement of at least a certain amount within a certain time period) in the monitored signal-quality metric. In at least one embodiment, attenuating the received signal includes selecting an amount of attenuation to be applied to the received signal based at least in part on external-system transmitter-properties data (e.g., location data, height data, transmission-power data, and the like).

Step 410 includes demodulating the attenuated received signal to obtain the signal of interest. In at least one embodiment, step 410 further includes outputting the demodulated signal. Step 410 may involve use of a demodulator. As examples, a demodulator could take the form of or include an electronic circuit, a computer program (e.g., in a software-defined radio), and/or the like, and is generally used to recover information content from a modulated carrier wave. As known to those having skill in the relevant art, there are many types of modulation, and consequently and correspondingly there are many types of demodulators. The signal output from a demodulator may represent sound (an analog audio signal), images (an analog video signal), binary data (a digital signal), and/or any other type of data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method comprising:
   receiving a signal in a first wireless band, the received signal comprising a signal of interest, wherein the received signal further comprises one or more neighbor-cell signals of the first wireless band;
   determining that a received signal quality of the signal of interest is less than a signal-quality threshold;

determining that the received signal quality of the signal of interest is less than the signal-quality threshold due to interference external to the first wireless band, wherein determining that the received signal quality of the signal of interest is less than the signal-quality threshold due to interference external to the first wireless band comprises determining that a calculated level of external interference exceeds an external-interference threshold, and responsively attenuating the received signal;

demodulating the attenuated received signal to obtain the signal of interest;

determining a plurality of received power levels, determining a plurality of reference signal received power (RSRP) levels of interest; and determining aggregate received power levels for the one or more neighbor-cell signals of the first wireless band based on the plurality of received power levels and RSRP levels.

2. The method of claim 1, further comprising measuring a reference signal received quality (RSRQ) of the signal of interest, wherein determining that the received signal quality of the signal of interest is less than the signal-quality threshold comprises determining that the measured RSRQ is less than an RSRQ threshold.

3. The method of claim 1, further comprising measuring a signal-to-noise-and-interference ratio (SINR) of the signal of interest, wherein determining that the received signal quality of the signal of interest is less than the signal-quality threshold comprises determining that the measured SINR is less than a SINR threshold.

4. The method of claim 1, wherein attenuating the received signal comprises:

iteratively increasing an amount of attenuation applied to the received signal while monitoring a signal-quality metric of the received signal; and stopping the iterative increasing of the amount of attenuation applied to the received signal in response to detecting no further improvement in the monitored signal-quality metric.

5. The method of claim 1, wherein attenuating the received signal comprises selecting an amount of attenuation to be applied to the received signal based at least in part on external-system transmitter-properties data.

6. The method of claim 1, further comprising outputting the demodulated signal.

7. The method of claim 1, wherein the received signal is being received by a single receiver of a mobile radio.

8. The method of claim 1, further comprising:

determining a current location; and obtaining interference-prediction data for the determined current location, wherein determining that the received signal quality of the signal of interest is less than the signal-quality threshold due to interference external to the first wireless band comprises determining that the received signal quality of the signal of interest is less than the signal-quality threshold due to interference external to the first wireless band based at least in part on the obtained interference-prediction data.

9. The method of claim 8, wherein obtaining the interference-prediction data for the determined current location comprises:

querying an interference-prediction database using the determined current location; and receiving the interference-prediction data from the interference-prediction database.

10. A method comprising:

receiving a signal in a first wireless band, the received signal comprising a signal of interest, wherein the received signal further comprises one or more neighbor-cell signals of the first wireless band;

determining that a received signal quality of the signal of interest is less than a signal-quality threshold;

determining that the received signal quality of the signal of interest is less than the signal-quality threshold due to interference external to the first wireless band, wherein determining that the received signal quality of the signal of interest is less than the signal-quality threshold due to interference external to the first wireless band comprises determining that a calculated level of external interference exceeds an external-interference threshold, and responsively attenuating the received signal;

demodulating the attenuated received signal to obtain the signal of interest; and determining a received power level of the received signal;

determining a received power level of the signal of interest and determining an aggregate received power level of the one or more neighbor-cell signals of the first wireless band, and wherein the calculated level of external interference is calculated by:

calculating the level of external interference to be equal to the difference between (i) the determined received power level of the received signal and (ii) the sum of (a) the determined received power level of the signal of interest and (b) the determined aggregate received power level of the one or more neighbor-cell signals of the first wireless band;

wherein determining the received power level of the signal of interest comprises:

determining a reference signal received power (RSRP) of the signal of interest; and determining the received power level of the signal of interest to be equal to the product of (i) the determined RSRP of the signal of interest and (ii) a number of resource blocks characteristic of a bandwidth of the signal of interest;

wherein determining the aggregate received power level of the one or more neighbor-cell signals of the first wireless band comprises:

determining a respective RSRP of each of the one or more neighbor-cell signals of the first wireless band; and determining the aggregate received power level of the one or more neighbor-cell signals of the first wireless band to be equal to the sum of the respective products of (i) the determined RSRP of each of the one or more neighbor-cell signals of the first wireless band and (ii) a number of resource blocks characteristic of a bandwidth of the corresponding neighbor-cell signal.

11. A method comprising:

receiving a signal in a first wireless band, the received signal comprising a signal of interest, wherein the received signal further comprises one or more neighbor-cell signals of the first wireless band;

determining that a received signal quality of the signal of interest is less than a signal-quality threshold;

determining that the received signal quality of the signal of interest is less than the signal-quality threshold due to interference external to the first wireless band, wherein determining that the received signal quality of the signal of interest is less than the signal-quality threshold due to interference external to the first wireless band comprises determining that a calculated level of external interference exceeds an external-interference threshold, and responsively attenuating the received signal;

demodulating the attenuated received signal to obtain the signal of interest;

determining a received power level of the received signal;

determining a received power level of the signal of interest and determining an aggregate received power level of the one or more neighbor-cell signals of the first wireless band, and wherein the calculated level of external interference is calculated by:

calculating the level of external interference to be equal to the difference between (i) the determined received power level of the received signal and (ii) the sum of (a) the determined received power level of the signal of interest and (b) the determined aggregate received power level of the one or more neighbor-cell signals of the first wireless band;

wherein determining the received power level of the signal of interest comprises:

determining a reference signal received power (RSRP) of the signal of interest; and determining the received power level of the signal of interest to be equal to the product of (i) the determined RSRP of the signal of interest and (ii) a number of resource blocks characteristic of a bandwidth of the signal of interest;

wherein determining the aggregate received power level of the one or more neighbor-cell signals of the first wireless band comprises:

determining a collective RSRP of the one or more neighbor-cell signals of the first wireless band; and determining the aggregate received power level of the one or more neighbor-cell signals of the first wireless band to be equal to the product of (i) the determined collective RSRP of the one or more neighbor-cell signals of the first wireless band and (ii) a number of resource blocks characteristic of an average bandwidth of the one or more neighbor-cell signals of the first wireless band.

12. A mobile radio comprising:

a wireless-communication interface;

a processor; and data storage containing instructions executable by the processor for causing the mobile radio to carry out a set of functions, the set of functions comprising:

receiving, via the wireless-communication interface, a signal in a first wireless band, the received signal comprising a signal of interest, wherein the received signal further comprises one or more neighbor-cell signals of the first wireless band;

determining that a received signal quality of the signal of interest is less than a signal-quality threshold;

determining that the received signal quality of the signal of interest is less than the signal-quality threshold due to interference external to the first wireless band, wherein determining that the received signal quality of the signal of interest is less than the signal-quality threshold due to interference external to the first wireless band comprises determining that a calculated level of external interference exceeds an external-interference threshold, and responsively attenuating the received signal;

demodulating the attenuated received signal to obtain the signal of interest;

determining a plurality of received power levels;

determining a plurality of reference signal received power (RSRP) levels of interest; and determining aggregate received power levels for the one or more neighbor-cell signals of the first wireless band based on the plurality of received power levels and RSRP levels.

13. The mobile radio of claim 12, wherein the mobile radio comprises a single receiver.

* * * * *